US012168566B2

(12) United States Patent
Nagl et al.

(10) Patent No.: US 12,168,566 B2
(45) Date of Patent: Dec. 17, 2024

(54) TRANSPORTING AND STORAGE CONTAINER FOR PEROXIDES

(71) Applicant: UNITED INITIATORS GMBH, Pullach (DE)

(72) Inventors: Iris Nagl, Munich (DE); Sven Gutewort, Stockdorf (DE); Agnes Uhl, Munich (DE); Dominik Hermann, Dachau (DE)

(73) Assignee: UNITED INITIATORS GMBH, Pullach (DE)

( * ) Notice: Subject to any disclaimer, the term of this patent is extended or adjusted under 35 U.S.C. 154(b) by 190 days.

(21) Appl. No.: 17/796,593

(22) PCT Filed: Jan. 29, 2021

(86) PCT No.: PCT/EP2021/052114
§ 371 (c)(1),
(2) Date: Jul. 29, 2022

(87) PCT Pub. No.: WO2021/152095
PCT Pub. Date: Aug. 5, 2021

(65) Prior Publication Data

US 2023/0072373 A1 Mar. 9, 2023

(30) Foreign Application Priority Data

Jan. 31, 2020 (DE) ..................... 10 2020 201 219.9

(51) Int. Cl.
*B65D 85/00* (2006.01)
*A62C 3/06* (2006.01)
(Continued)

(52) U.S. Cl.
CPC .............. *B65D 85/84* (2013.01); *A62C 3/065* (2013.01); *B65D 77/062* (2013.01); *B65D 2213/00* (2013.01)

(58) Field of Classification Search
CPC ...... A62C 3/065; B65D 85/84; B65D 77/062; B65D 2213/00
(Continued)

(56) References Cited

U.S. PATENT DOCUMENTS 3,764,035 A * 10/1973 Silverman .............. B65D 81/18 220/900
4,931,333 A 6/1990 Henry
(Continued)

FOREIGN PATENT DOCUMENTS

DE 8236728 U1 4/1983
DE 102010035959 A1 3/2012
(Continued)

OTHER PUBLICATIONS

German Application No. DE102020201219.9, Office Action mailed Sep. 4, 2020, 4 pages.
(Continued)

*Primary Examiner* — Steven A. Reynolds
(74) *Attorney, Agent, or Firm* — Kilpatrick Townsend & Stockton LLP

(57) ABSTRACT

A packaging unit for one or more of transport or storage of at least one organic peroxide. The packaging unit comprises one or more outer container, such as a transport container and/or a storage container. The packaging unit may also comprise an inner container. The outer container and/or the inner container is filled with the at least one organic peroxide. The packaging unit also comprises one or more extinguishing agent container filled with an extinguishing agent. The extinguishing agent container may be at least one bag and/or at least one bottle. The extinguishing agent container is separately introduced into one or more of a receiving area of the outer container or the inner container. The extinguishing agent container is removable from the outer container.
(Continued)

The extinguishing agent container may be detachably connected to or not connected to the outer container, or the extinguishing agent container may be detachably connected to or not connected to the inner container. The extinguishing agent is released from the extinguishing agent container by heat-induced melting, bursting, burning or tearing of the extinguishing agent container.

24 Claims, 1 Drawing Sheet

(51) Int. Cl.
*B65D 77/06* (2006.01)
*B65D 85/84* (2006.01)

(58) Field of Classification Search
USPC ............................ 220/88.1; 206/205; 169/68
See application file for complete search history.

(56) References Cited

U.S. PATENT DOCUMENTS 7,422,143 B2 * 9/2008 Mayer ................ B65D 81/3823 220/592.2
8,006,622 B2 * 8/2011 Munoz Saldarriaga .................... F42B 39/14 102/314

FOREIGN PATENT DOCUMENTS

| | | | |
|---|---|---|---|
| DE | 102014117022 | A1 | 5/2016 |
| EP | 0775637 | A1 | 5/1997 |
| EP | 1340692 | A1 | 9/2003 |
| GB | 986185 | A | 3/1965 |
| GB | 1213138 | A | 11/1970 |
| KR | 20100009314 | U | 9/2010 |
| WO | 2017089375 | A1 | 6/2017 |
| WO | 2019121371 | A1 | 6/2019 |

OTHER PUBLICATIONS

German Application No. DE102020201219.9 , "Office Action", Sep. 9, 2020, 7 pages.

International Application No. PCT/EP2021/052114 , "International Search Report and Written Opinion", May 11, 2021, 13 pages.

* cited by examiner

TRANSPORTING AND STORAGE CONTAINER FOR PEROXIDES

CROSS REFERENCE TO RELATED APPLICATION

This application is a U.S. national phase of International Patent Application No. PCT/EP2021/052114 filed on Jan. 29, 2021, which claims priority to German Patent Application No. 10 2020 201 219.9, filed in Germany on Jan. 31, 2020. The entire contents of both applications are hereby incorporated herein by reference.

The present invention relates to a packaging unit for the transport and/or storage of at least one organic peroxide, which is designed to ensure improved storage and transport safety of organic peroxides.

The invention further relates to a kit for a packaging unit for transporting and/or storing at least one organic peroxide, comprising (i) an outer container for receiving at least one inner container, (ii) an inner container filled with at least one organic peroxide, and (iii) at least one bag and/or bottle filled with an extinguishing agent.

Organic peroxides are temperature-sensitive and highly unstable compounds. In their pure form, organic peroxides are sometimes shock-sensitive or even explosive and are classified as "dangerous goods". Consequently, they may only be transported, stored and handled under certain conditions and subject to stringent technical requirements. The hazards they pose are to be controlled and virtually eliminated by compliance with certain regulations. These regulations concern, among other things, the type of packaging, the limitation of the amount of peroxide in the packages, and safety advice for transport, storage and handling. In this regard, the transport regulations allow for different types of packaging, depending on the hazardousness or thermal stability of the products in question (e.g., canisters, drums, intermediate bulk containers (IBCs) or bulk containers).

The transport regulations also determine for each product the maximum permissible quantity per transport or storage container (e.g. in the case of methyl ethyl ketone peroxides max. 60 liters for UN No. 3105, up to 225 liters for UN No. 3107).

Based on their properties, organic peroxides are divided into different storage or transport classes (so-called "hazard groups") in accordance with national legislation. The lower the hazard group (storage class) of an organic peroxide, the higher the danger posed by the peroxide and the smaller the quantity of peroxide that may be stored or transported. Consequently, if the hazard group is low, high safety requirements must be observed when storing or transporting the peroxide.

Due to the danger of peroxide decomposition, explosiveness and fire development in particular are dangerous and undesirable properties during storage and transport of organic peroxides. The burn speed of the organic peroxide is decisive for the classification into the hazard group. Standardized tests are used to determine how long it takes for a quantity of peroxide to burn off. The lower the hazard group, the higher the burn speed.

The burn test for assigning the hazard group of organic peroxides on a small scale is described, for example, in DGUV (German Statutory Accident Insurance), regulation 13 (BG RCI). On a packaging scale, the burn test and the classification criteria are described in "Recommendations on the Transport of Dangerous Goods, Manual and Criteria, Chap. 51" (*UN Manual of Tests and Criteria*: paragraph 51).

Table 1 shows the different classifications of the standardized small- and large-volume burn tests with the corresponding assigned hazard group of peroxide.

TABLE 1

Classification of peroxide hazard groups based on burn speed and burn rate $A_k$

| Hazard group (DE) | Burn speed in kg/(min*m$^2$) small volume | Burn rate $A_k$ in kg/min large volume, packaging tests |
|---|---|---|
| Ia | ≥9.0 | ≥300 and <1200 |
| Ib | ≥2.2 and <9.0 | ≥140 and <300 |
| II | ≥0.9 and <2.2 | ≥60 and <140 |
| III | <0.9 | <60 |

The burn rates of liquid peroxides are determined by small-volume tests in which the peroxide is burned without packaging. For example, the burn speed of methyl ethyl ketone peroxide (NOROX MEKP-9) is 5.1 kg/(min*m$^2$) and thus corresponds to hazard group Ib. However, burn tests on a large scale (so-called "full scale" tests) show that a real burn test in approved packaging has a lower burn rate. Consequently, the type of packaging has an influence on the burn rate.

A high burn speed and a low hazard group of an organic peroxide thus require high technical requirements for a safe storage and/or safe transport of the respective peroxide. Consequently, it is desirable to reduce the burn speed of a peroxide in the storage and/or transport packaging in order to advantageously increase the hazard group of the peroxide and thereby enable improved requirements for the storage and transport of the respective peroxide.

WO 2017/089375 describes a reduction in the burn speed of bis(4-tert-butylcyclohexyl) peroxydicarbonate (BCHPC) with the aid of admixed phlegmatizers. Phlegmatized BCHPC preparations with reduced burn speed are also described in WO 2019/12371.

However, manufacturers and fabricators of organic peroxides are interested in avoiding or minimizing phlegmatization by adding or admixing phlegmatizers to the peroxide preparation, if possible. Phlegmatizers are ballast substances that only incur expense and can also interfere with the further processing and use of the organic peroxides.

Modification of the packaging for storage and transport of the peroxides is not mentioned in WO 2017/089375 or WO 2019/12371.

U.S. Pat. No. 4,931,333 describes thermal protection of goods that must be packaged or transported in a thermally controlled environment by providing a transport packaging comprising capsules containing thermal control means to maintain a predetermined temperature range over a period of time. EP 1 340 692 A1 further describes a packaging assembly comprising an inner container surrounded by fluid-filled bags in an outer container to mitigate shocks.

None of the packagings described in U.S. Pat. No. 4,931,333 or EP 1 340 692 influences the burn speed of the stored or transported goods.

It was therefore an object of the present invention to reduce the burn speed of organic peroxides and to provide a packaging unit for the transport and/or storage of organic peroxides which has a lower burn rate than commercially available packaging units. Advantageously, the packaging unit modified according to the invention achieves a regrading, preferably an increase in the hazard group of the stored and/or transported peroxide, without having to add further ballast substances to the organic peroxide.

In the present invention, it was surprisingly found that the burn speed and/or burn rate of organic peroxides in a transport and/or storage packaging unit can be substantially reduced if separate bags and/or bottles filled with extinguishing agent are additionally added in the packaging containing single containers filled with peroxide.

An advantage of the present invention is thus the provision of a packaging unit for the transport and/or storage of organic peroxides which has a simple structure and can be used with any commercially available packaging for organic peroxides. Furthermore, advantageously, the packaging unit according to the present invention avoids possible malfunctions in the release of the extinguishing agent during the development of hazards, which may occur when using known control and/or release mechanisms of extinguishing systems, so that a safe and reliable reduction of the burn speed of the peroxide in the packaging unit is ensured.

A first subject matter of the present invention is therefore a packaging unit for the transport and/or storage of at least one organic peroxide comprising (i) a transport and/or storage container consisting of an outer container capable of receiving at least one inner container filled with the at least one organic peroxide; and (ii) at least one bag and/or bottle filled with an extinguishing agent, wherein the at least one bag and/or the at least one bottle is separately introduced into the outer container and/or into the at least one inner container of the transport and/or storage container and is detachably connected or not connected to the outer container and to the inner container filled with peroxide.

According to the invention, the outer container of the transport and/or storage container is designed to receive the at least one inner container filled with the at least one organic peroxide. Consequently, the transport and/or storage container of the packaging unit according to the invention consists of an outer container and at least one inner container filled with peroxide, which is accommodated in the outer container.

Another subject matter of the invention concerns a kit for a packaging unit for the transport and/or storage of at least one organic peroxide, comprising (i) an outer container for receiving at least one inner container, (ii) an inner container filled with at least one organic peroxide, and (iii) at least one bag and/or bottle filled with an extinguishing agent.

When assembling the kit, the at least one inner container filled with the peroxide and the at least one bag and/or bottle filled with extinguishing agent are added separately into the outer container so that the at least one inner container and the at least one bag and/or bottle are in an unconnected or detachably connected state in the outer container. Alternatively, the at least one extinguishing agent-filled bag and/or bottle is added loosely connected into the peroxide-filled inner container.

In the event of a fire of the peroxide contained in the at least one inner container of the packaging or if heat is generated above a critical temperature inside the transport and/or storage container, the at least one bag and/or bottle contained in the outer container and/or inner container releases the extinguishing agent by exposure to the fire or warmth/heat. Preferably, the extinguishing agent is released from the at least one bag or at least one bottle by warmth/heat-induced melting, bursting, burning or tearing of the bag and/or bottle. Thus, advantageously, the peroxide burning in the transport and/or storage packaging is diluted or extinguished and a fire is prevented or the fire development is reduced or neutralized.

According to the invention, when a hazardous situation occurs as mentioned above, the extinguishing agent advantageously escapes directly into the packaging unit, in particular directly into the interior of the outer container and/or into the interior of the inner container, merely by the action of warmth or heat on the bag and/or bottle. The packaging unit according to the invention does not comprise triggering units which, by means of built-in sensors for determining defined parameter values, release the extinguishing agent via control and/or activation units. With such detection and activation devices, malfunctions can occur in the installation and/or the activation, which prevent release of the extinguishing agent in case of danger. In contrast, the release of the extinguishing agent in the packaging unit according to the invention is reliably ensured when a fire occurs.

Consequently, the addition of bags and/or bottles filled with extinguishing agent to the transport or storage packaging of organic peroxides according to the invention substantially reduces the burn speed and/or the burn rate of the peroxide. Preferably, the packaging unit according to the invention reduces the burn speed and/or the burn rate of the peroxide by at least 15%, preferably by at least a quarter, compared to the burn speed and/or the burn rate in the same packaging without the addition of bags filled with extinguishing agent.

In a preferred embodiment, the packaging unit according to the invention leads to a reclassification, preferably to an increase in the hazard group of the organic peroxide, in particular by at least one group.

According to the invention, the at least one bag and/or bottle filled with extinguishing agent is present separately in the outer container and/or separately in the at least one inner container of the transport and/or storage container. When the at least one bag and/or at least one bottle is present in the outer container, the bag/bottle is detachably connected or not connected to the at least one inner container filled with peroxide. In terms of the present invention, this means that the bag and/or bottle can individually, independently, and separately of the inner container filled with peroxide, be added to, inserted into, introduced or secured within the outer container of the container in a simple manner, and is not connected to the other components of the packaging. Similarly, the bag and/or bottle can be taken or removed from the container individually, independently, and separately from the peroxide-filled inner container. The at least one bag and/or bottle may also be present in the inner container along with the organic peroxide. The bag and/or bottle is also added to, inserted into and introduced, or taken or removed from the inner container individually, independently and separately from the organic peroxide. There is no mixing of the extinguishing agent contained in the bag and/or bottle and the organic peroxide during transport and/or storage, without the occurrence of the hazardous situations described above.

A plurality of individual bags and/or bottles filled with extinguishing agent can be introduced into the outer container and/or into the at least one inner container of the transport and/or storage container. For example, individual bags and/or bottles can each be introduced in a detachable state into cavities and spaces and/or gaps between the inner containers filled with peroxide and into cavities and spaces and/or gaps between the inner container and the outer container. In the finished assembly of the packaging according to the invention, the bags and/or the bottles are preferably packed around the peroxide-filled inner containers. Further, for example, at least one or a plurality of individual bags and/or bottles filled with extinguishing agent may be located in each peroxide-filled inner container.

In a particularly preferred embodiment of the invention, 2 to 14 or 4 to 12 or 6 to 10 bags and/or bottles per transport and/or storage container are included in a packaging unit and/or the kit. Particularly preferably, 8 bag units and/or bottles are placed in a transport and/or storage container.

In a further preferred embodiment of the invention, each bag and/or bottle contains 50 ml to 2000 ml, preferably 100 ml to 1850 ml or 200 ml to 1500 ml or 400 ml to 1200 ml or 500 ml to 800 ml of extinguishing agent. Bags and/or bottles filled with approximately 500 ml of extinguishing agent are particularly suitable. The amount of extinguishing agent contained in the bag and/or bottle must be suitable and sufficient to dilute and partially or completely extinguish the peroxide contained in the packaging when it begins to burn or exceeds a certain temperature.

According to the invention, the bags and/or bottles filled with extinguishing agent are inserted loosely or detachably connected into the receiving area of the outer container, in which the inner containers filled with organic peroxide are also present. Preferably, the bags and/or bottles filled with extinguishing agent and the inner containers filled with peroxide are not connected in the receiving area of the outer container.

The individual bags and/or bottles may be packaged in the outer container separately or distinctly from the inner containers of the peroxide. Preferably, the bags and/or bottles are also separate or distinct from the outer container.

According to the invention, the individual bags and/or bottles filled with extinguishing agent are not firmly connected to the outer container and/or inner container and/or structurally integrated in the outer container and/or inner container.

The individual bags and/or bottles can also be packed separately or distinctly inside the inner container. Preferably, the individual bags and/or bottles are evenly distributed inside the inner container and are present separately and loosely or detachably connected with the peroxide in the inner container.

The individual bags and/or bottles may have different shapes and outer surfaces. Preferably, the shape of the bags is such that the bag can be packed around the at least one inner peroxide container, or the bag can fill the voids and interstices, and/or gaps between the inner containers or between the inner containers and the outer container. For example, the individual bags may be pillow-shaped, pellet-shaped, egg-shaped, tubular, or have other shapes, such as a square, rectangular, triangular, round, or curved outline.

In a preferred embodiment of the present invention, the individual bags are in the form of a bag web or bag film having several separate inner chambers which are filled with extinguishing agent and which are self-contained but interconnected by connecting sections. Thus designed webs or films are known in commercially available packaging materials as air cushion webs, air bubble films or blisters. The number, size and shape of the inner chambers of the bag web or bag film can vary and be adapted depending on application.

Preferably, the inner chambers of the bag web or bag film have the same preferred shapes and dimensions as described above for the individual bags according to the invention.

According to another preferred embodiment, bottles filled with extinguishing agent are included in the packaging unit. The bottles fulfill the same functions as the bags described above and can equally be placed in the outer container and/or the at least one inner container of the transport and/or storage container. Advantageously, the bottles can be emptied after use and can be taken back, for example, as in a deposit system.

The number as well as the dimension, size and shape of the bags, bag webs or bag films and/or bottles placed in the packaging unit can vary according to the specific application, i.e. according to the specific packaging unit in which they are placed, and can be adapted accordingly. In particular, the number, dimension, size and shape of the bags or inner chambers of the bag web or bag film and/or bottles depends on the type and size of the packaging unit and the type and size of the peroxide inner containers, as well as on the total amount, composition and hazard group of the organic peroxide transported and/or stored. The individual bags filled with extinguishing agent, which are placed in the container individually or connected in webs and/or films, and the individual bottles filled with extinguishing agent each have a size that is usually smaller than the size of the single container filled with peroxide. According to the invention, the ratio of relative size (based on volume) of the individual bag and/or individual bottle to relative size of the inner container is 1:10 to 1:2, preferably 1:8 to 1:3 or 1:7 to 1:4.

In order to achieve a desired reduction of the burn speed or burn rate of the respective peroxide, the total filling amount of the bags and/or bottles added in the container can be adjusted with the total filling amount of organic peroxide stored and/or transported in the inner containers. According to the invention, the ratio of total filling amount of extinguishing agent in the packaging unit to total filling amount of organic peroxide in the packaging unit is preferably 10:90 to 40:60 wt %. Particularly preferably, the ratio is 15:85 to 35:75 or 20:80 to 30:70 wt %.

According to the invention, the at least one bag is formed of a continuous outer skin or shell, preferably a flexible outer skin. The most preferred material for producing the outer skin of the bag is a plastic material, preferably a flexible plastic material. The plastic material is preferably in the form of a film.

The material of the outer skin or the envelope of the bag according to the invention is suitable for releasing the extinguishing agent contained therein in the event of a fire starting or in the event of warmth or heat development above a critical temperature.

Preferably, the extinguishing agent is released from the at least one bag and/or one bottle by exposure to a temperature greater than 30° C. or greater than 35° C., preferably greater than 40° C. or greater than 45° C., and especially preferably greater than 50° C. or greater than 55° C., and most preferably at a temperature greater than 60° C.

Preferably, the material of the outer skin or envelope of the bag is capable of melting, burning, bursting, rupturing, dissolving and releasing the contained extinguishing agent into the transport and/or storage container by the action of fire or warmth or heat. Suitable plastic materials, for example, are polyethylene, polypropylene, polyester, polycarbonate or the like. However, according to the invention, bags made of materials selected from glass, coated paper or cardboard, or metal (aluminum foil) are also suitable. Preferably, the bags filled with extinguishing agent are made of polyolefins (e.g. polyethylene, polypropylene). Correspondingly suitable materials can also be used for the bottles according to the invention.

The bags and/or bottles of the packaging according to the invention filled with extinguishing agent can be reused as often as desired by simply removing them from the packaging unit after the transport has been carried out and/or the storage of the packaged peroxide has been completed and inserting or placing them in a new packaging unit for further use. Advantageously, the bottles can be emptied after use where applicable and taken back, for example, as in a deposit system.

Thus, the bags and/or bottles have the advantage of being versatile for any number and type of packaging units for transporting and/or storing different organic peroxides. Furthermore, the extinguishing agent-filled bags and/or bottles according to the invention can be used in kits comprising different shapes and types of outer containers and/or inner containers.

Furthermore, the bags and/or bottles according to the invention advantageously have a long service life and can be used at low cost.

In principle, any extinguishing agent known to the skilled person is suitable as an extinguishing agent in the sense of the present invention. The extinguishing agent filled in the bags of the packaging unit according to the invention may be in liquid or solidified form. An extinguishing agent in solid form is also suitable.

Particularly preferably, the extinguishing agent is in the form of a liquid. The term liquid is used here in the broadest sense to comprise, for example, mixtures, solutions, dispersions and emulsions of low to very high viscosity, including gels and pastes.

Particularly suitable extinguishing agents are liquid inert extinguishing agents, such as those selected from water, chemical extinguishing agents, extinguishing foam, extinguishing powder, water-impregnated superabsorbents, compressed water (e.g., with xanthan gum), or combinations of two or more of these extinguishing agents.

In a particularly preferred embodiment of the present invention, the extinguishing agent is water. When water is used as the extinguishing agent, water without further additives is preferably used. Advantageously, compared to other extinguishing agents, water is inexpensive, non-toxic, pH-neutral, non-corrosive and easy to obtain. However, according to the invention, it is also possible to use water with suitable additives as the extinguishing agent. Suitable additives comprise, for example, wetting agents, gelling agents, salts and combinations thereof.

Furthermore, the liquid extinguishing agent, in particular the water, can be present in solidified form in the bags of the packaging unit according to the invention. In this case, the liquid extinguishing agent is added, for example, via a liquid absorber. For example, the water may be in the form of water-impregnated liquid absorbers in the bags. Suitable liquid absorbers comprise superabsorbents and silicates (for example, vermiculite).

In another preferred embodiment, the at least one bag and/or the at least one bottle in the transport and/or storage container is filled with solid extinguishing agent. Examples of solid extinguishing agents are expanded glass and sand. Particularly preferably, the solid extinguishing agent is expanded glass. Expanded glass is in the form of granules, which preferably have a particle size of 0.04 to 16 mm, particularly preferably of 4-8 mm.

According to the invention, the outer container of the transport and/or storage container is designed to receive the at least one inner container filled with organic peroxide. Thereby, the at least one inner container is placed in a receiving area of the outer container. The outer container of the transport and/or storage container of the packaging unit according to the invention may be a carton, a box, a crate, a tub, a drum or a similar container suitable for containing single containers filled with organic peroxides. The outer container typically has side walls, a bottom wall, and a top wall, as well as a closure, such as a lid, to receive the peroxide-filled inner containers and the bags and/or bottles filled with extinguishing agent. Suitable outer containers are made of a material selected from plastic, metal, cardboard or wood. Particularly preferably, the outer container is made of cardboard.

The inner container filled with the at least one organic peroxide may be a bottle, a bag (especially for solid peroxides), a drum, a canister, a carton, or any container suitable for containing the organic peroxide. For liquid peroxides, the inner containers are preferably bottles or canisters, preferably made of a material selected from plastics. For solid organic peroxides, the inner containers are preferably cartons or bags, preferably made of a material selected from cardboard and/or plastics. Particularly preferably, the inner container is made of polyethylene or polypropylene. In the packaging unit according to the invention, there are preferably 2-14 or 4-12 or 6-10 inner containers filled with peroxide.

According to an alternative preferred embodiment of the present invention, the peroxide is added directly into the outer container in the packaging unit. In this case, the organic peroxide is present in the receiving area of the outer container and is not filled into separate inner containers. According to this embodiment, the outer container fulfills the same functions as the inner containers described above. The bags and/or bottles filled with extinguishing agent can be added to the outer container separately and loosely or detachably connected.

Consequently, a further subject matter of the present invention is a packaging unit for the transport and/or storage of at least one organic peroxide comprising (i) a transport and/or storage container consisting of an outer container filled with the at least one organic peroxide; and (ii) at least one bag and/or bottle filled with an extinguishing agent, wherein the at least one bag and/or the at least one bottle is separately introduced into the outer container of the transport and/or storage container and is detachably connected or not connected to the outer container filled with peroxide.

Another subject matter of the invention relates to a kit for a packaging unit for the transport and/or storage of at least one organic peroxide, comprising (i) an outer container filled with at least one organic peroxide, and (ii) at least one bag and/or bottle filled with an extinguishing agent.

The at least one organic peroxide is present in the inner containers in liquid or solid form.

Organic peroxides for transport and/or storage in the packaging unit according to the invention are preferably selected from ketone peroxides, peroxycarbonates, in particular peroxymonocarbonates and/or peroxydicarbonates, diacyl peroxides, dialkyl peroxides, peresters or peroxyesters, perketals or peroxyketals and hydroperoxides.

Particularly preferred organic peroxides suitably transported and/or stored in the packaging unit of the present invention are selected from ketone peroxides, particularly preferred are methyl ethyl ketone peroxide (MEKP) and/or methyl isobutyl ketone peroxide (MIKP), peroxycarbonates, particularly preferred are bis(4-tert-butylcyclohexyl) peroxydicarbonate (BCHPC), dicetyl peroxycarbonate (CEPC) and/or dimyristyl peroxycarbonate (MYPC), diacyl peroxides, particularly preferred are dilauroyl peroxide (LP), and/or dibenzoyl peroxide (BP), peresters, perketals and hydroperoxides.

Further preferred organic peroxides for transport and/or storage in the packaging unit according to the invention are dialkyl peroxides, in particular 2,5-dimethyl-2,5-di(tert-butylperoxy)-hexane (DHBP) and/or di-tert-butyl peroxide (DTBP), hydroperoxides, in particular tert-butyl hydroperoxide (TBHP), peroxyketals, in particular 1,1-di(tert-butylperoxy)-cyclohexane 80% (CH-80-AL), peroxy esters, in particular tert-butylperoxy-2-ethylhexanoate (TBPEH) and/or tert-amylperoxypivalate 75% (TAPPI-75-AL) and peroxymonocarbonates, in particular tert-butylperoxy-2-ethylhexylcarbonate (TBPEHC).

Also suitable are mixtures of two or more of these peroxides.

A further subject matter of the present invention is the use of a packaging unit for transporting and/or storing at least one organic peroxide as described above for reducing the burn speed and/or the burn rate of the organic peroxide contained in the packaging. A further subject matter of the present invention is to use the packaging unit according to the invention for regrading, preferably for increasing the hazard group of the organic peroxide by at least one group.

The invention shall be further illustrated by the following Figure and the following Examples.

EXAMPLES

Figures 1, 1A, 1B:
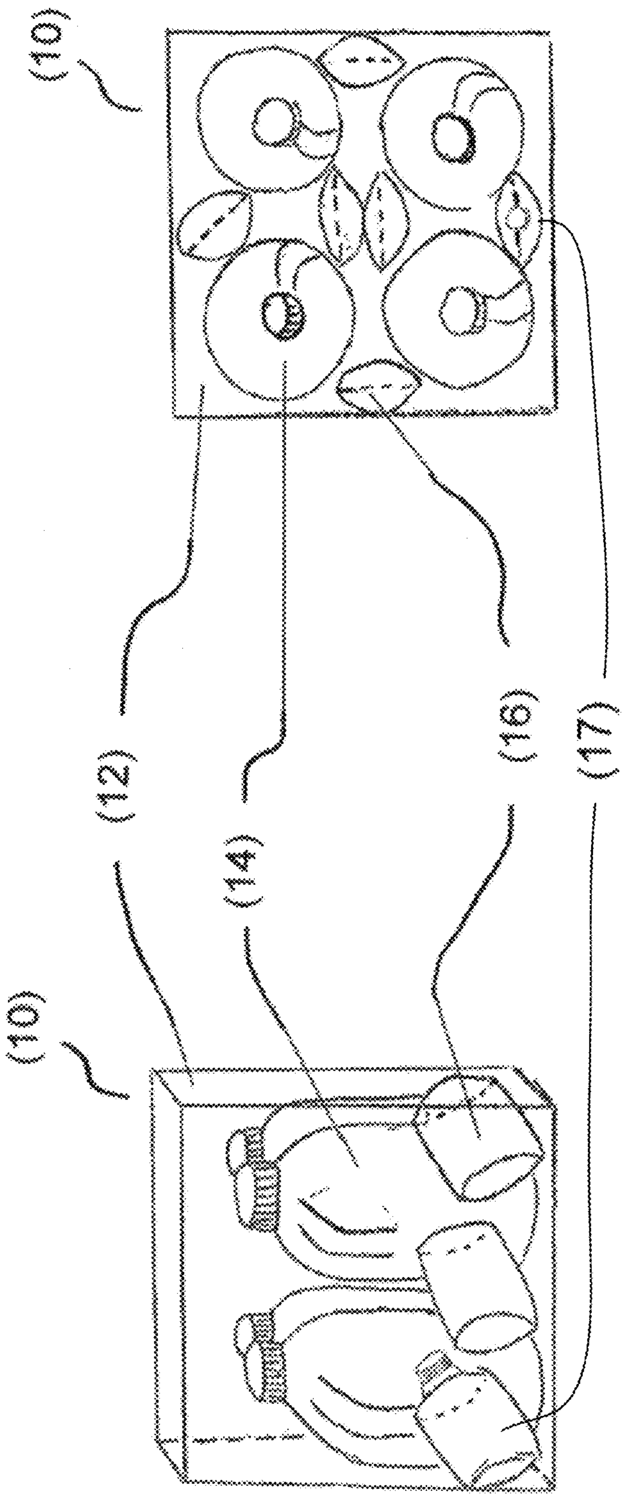
FIG. 1 shows a view of a packaging unit (10) according to the invention, which contains an outer container (12) (preferably a carton) with four bottles filled with peroxide (which serve as inner containers (14)). According to the invention, bags (16) and/or bottles (17) filled with water are located in the cavities of the outer container, which are evenly distributed around the bottles.
FIG. 1A shows a side view, FIG. 1B a top view of the packaging unit (10).

For both liquid organic peroxides (Example 1) and solid organic peroxides (Example 2), the addition of water-filled bags to the packaging unit reduced the burn rate of the organic peroxide.

Example 1—Methyl Ethyl Ketone Peroxide Norox Mekp-9

A standard package of NOROX MEKP-9 consisting of 4×8 U.S. pound (lbs) bottles (inner containers) contained in a carton (outer container) had 6×500 g water bags placed in each cavity between the bottles in the carton. This included one bag in each of the outer corners and two bags in the center between the bottles.

Set-up of the burn tests: Six cartons were placed on a wooden pallet surrounded by wooden slats. Between the wooden slats is wood wool, which was soaked with a gasoline/diesel mixture and ignited by means of an electric igniter. The thermal radiation of the burning is registered by means of four sensors and the burn rate is determined in accordance with Sprengstofflagerrichtlinie 011 (SprengLR 011) ("Explosives Storage Guideline 011") and BG Regulation B4 (DGUV Regulation 13). For comparison, the test was repeated without the water packs.

It could be shown that the addition of water-filled bags to the standard packaging reduces the burn rate by about half (Table 2, entries 1 and 2).

In the case of the smaller single packagings with one 8 lbs bottle, the burn rate was significantly higher than in the case of packagings with 4×8 lbs bottles. Also in this case the burn rate could be reduced by adding water bags. (Table 2, entries 3 and 4). It could thus be shown that storage and transport safety can be increased.

TABLE 2

Test results of the BAM burn tests of MEKP in different packagings (Ref. 2).

| Type of packaging NOROX MEKP-9 | Burn rate $A_k$ in kg/min |
|---|---|
| Standard packaging 4 × 8 lbs per carton | 134 |
| Standard packaging 4 × 8 lbs per carton with 6 × 500 g water bags | 70 |
| Single packaging 1 × 8 lbs per carton | 233 |
| Single packaging 1 × 8 lbs per carton with 1 × 500 g water bag | 101 |

Example 2—Bis(4-Tert-Butylcyclohexyl) Peroxydicarbonate (Bchpc)

The standard packaging of BCHPC consists of a carton (outer container) with 4×5 kg sacks (inner containers) of BCHPC. Each sack in turn contains a bag filled with 1.25 kg of water.

Set-up of the burn test: Six cartons were placed on a wooden pallet surrounded by wooden slats. Wood wool was placed between the wooden slats, impregnated with a gasoline/diesel mixture and ignited by means of an electric igniter. The thermal radiation of the burn was registered by means of four sensors and the burn rate was determined in accordance with Sprengstofflagerrichtlinie 011 (SprengLR 011) ("Explosives Storage Guideline 011") and BG Regulation B4 (DGUV Regulation 13) (Ref. 2 BAM report dated Sep. 4, 2019, Ref. 3 UN Manual of Tests and Criteria; Paragraph 51).

When water-filled bags were added, the burn rate also decreased in the case of solids. The example concerning bis-(tert-butylcyclohexyl)-peroxydicarbonate (BCHPC) shows that the burn rate can be reduced by approx. 300 kg/min by adding water bags (see Table 3).

TABLE 3

Test results of the BAM burn tests of BCHPC in different packagings.

| Packaging type BCHPC | Burn rate $A_k$ in kg/min |
|---|---|
| Standard packaging 4 × 5 kg BCHPC per carton | 887 |
| Standard packaging 4 × 5 kg BCHPC per carton + 1.25 kg water bag in each BCHPC 5 kg bag | 591 |

Example 3—Burn Tests with Different Organic Peroxides

Burn tests were carried out with 100 g peroxide in each case. The respective peroxide was first burned without adding water bags and the burn speed was determined in kg/(min*m$^2$) according to standardized procedures.

The same tests were then repeated, with two or four bags, each containing 5 g of water, being added to the respective 100 g peroxide in the container. In these tests, too, the burn speed was determined in kg/(min*m$^2$).

Table 4 shows the results of the burn tests, indicating the relative burn speed of the respective peroxides.

TABLE 4

| | TBHP | DTBP | DHBP | CH-80-AL | TBPEH | TAPPI-75-AL | TBPEHC |
|---|---|---|---|---|---|---|---|
| Without extinguishing agent | 100% | 100% | 100% | 100% | 100% | 100% | 100% |
| With two water bags | 89% | 89% | 88% | 96% | 62% | 87% | 84% |
| With four water bags | — | 62% | 67% | — | 40% | 54% | 53% |

* DHBP: 2,5-dimethyl-2,5-di(tert-butylperoxy)-hexane
DTBP: Di-tert-butyl peroxide
TBHP: tert-butyl hydroperoxide
CH-80-AL: 1,1-di(tert-butylperoxy)-cyclohexane 80%.
TBPEH: tert-butyl peroxy-2-ethyl hexanoate
TAPPI-75-AL: tert-amyl peroxypivalate 75%
TBPEHC: tert-butyl peroxy-2-ethylhexyl carbonate

The invention claimed is:

1. A packaging unit for one or more of transport or storage of at least one organic peroxide, the packaging unit comprising:
   - an outer container and an inner container, the outer container being capable of receiving the inner container filled with the at least one organic peroxide; and
   - an extinguishing agent container filled with an extinguishing agent,
   - wherein the extinguishing agent container is separately introduced into the packaging unit so as to be contained within a receiving area of the outer container or within the inner container, and
   - wherein the extinguishing agent container is removable from the packaging unit.

2. The packaging unit of claim 1, wherein the extinguishing agent container is introduced into the receiving area of the outer container and is detachably connected or not connected to the outer container.

3. The packaging unit of claim 1, wherein the extinguishing agent container is introduced into the outer container and is detachably connected or not connected to the inner container.

4. The packaging unit claim 1, wherein the extinguishing agent container is filled with a volume of between 50 milliliters to 2000 milliliters of the extinguishing agent.

5. The packaging unit of claim 1, wherein a ratio of a relative size of the extinguishing agent container to a relative size of the inner container is within a range of approximately 1:10 to approximately 1:2.

6. The packaging unit of claim 1, wherein a ratio of a total filling amount of the extinguishing agent in the packaging unit to a total filling amount of the at least one organic peroxide in the packaging unit is within a range of approximately 10:90 to approximately 40:60 percentage by weight.

7. The packaging unit of claim 1, wherein the extinguishing agent container comprises at least one bag.

8. The packaging unit of claim 1, wherein the extinguishing agent is in a liquid form, a solidified form, or a solid form.

9. The packaging unit of claim 1, wherein the extinguishing agent is selected from (A) water, (B) chemical extinguishing agents, (C) extinguishing foam, (D) extinguishing powder, (E) water-impregnated superabsorbents, (F) compressed water, (G) expanded glass, (H) sand, or (I) a combination of any two or more thereof.

10. The packaging unit of claim 1, wherein the at least one organic peroxide is in a liquid form or in a solid form.

11. The packaging unit of claim 1, wherein the at least one organic peroxide is selected from (A) ketone peroxides, (B) peroxycarbonates, (C) diacyl peroxides, (D) peresters, (E) perketals or, (F) hydroperoxides.

12. The packaging unit of claim 1, wherein the extinguishing agent container comprises a bag formed of a continuous outer skin comprising a flexible material.

13. The packaging unit of claim 12, wherein the flexible material is a flexible plastic material.

14. The packaging unit of claim 1, wherein the extinguishing agent container comprises at least one bottle.

15. The packaging unit of claim 1, wherein a plurality of extinguishing agent containers are introduced into the packaging unit.

16. The packaging unit of claim 1, wherein the extinguishing agent is released from the extinguishing agent container by heat-induced melting, bursting, burning or tearing of the extinguishing agent container.

17. A packaging unit for one or more of transport or storage of at least one organic peroxide, the packaging unit comprising:
   - an outer container filled with the at least one organic peroxide; and
   - an extinguishing agent container filled with an extinguishing agent, the outer container being capable of receiving the extinguishing agent container, wherein the extinguishing agent container comprises at least one of a bag or a bottle, and wherein the extinguishing agent container is introduced into a receiving area of the outer container and is removable from the outer container.

18. The packaging unit of claim 17, wherein the extinguishing agent container is detachably connected or not connected to the outer container.

19. The packaging unit of claim 17, wherein a ratio of a total filling amount of the extinguishing agent in the packaging unit to a total filling amount of the at least one organic peroxide in the packaging unit is within a range of approximately 10:90 to approximately 40:60 percentage by weight.

20. The packaging unit of claim 19, wherein the extinguishing agent is in a liquid form, a solidified form, or a solid form.

21. The packaging unit of claim 17, wherein the extinguishing agent is selected from (A) water, (B) chemical extinguishing agents, (C) extinguishing foam, (D) extinguishing powder, (E) water-impregnated superabsorbents, (F) compressed water, (G) expanded glass, (H) sand, or (I) a combination of any two or more thereof.

22. The packaging unit of claim 17, wherein the at least one organic peroxide is selected from (A) ketone peroxides, (B) peroxycarbonates, (C) diacyl peroxides, (D) peresters, (E) perketals, or (F) hydroperoxides.

23. The packaging unit of claim 17, wherein the extinguishing agent container is filled with a volume of between 50 milliliters to 2000 milliliters of the extinguishing agent.

24. The packaging unit of claim 17, wherein the extinguishing agent is released from the extinguishing agent container by heat-induced melting, bursting, burning or tearing of the extinguishing agent container.

* * * * *